United States Patent [19]

Dupre

[11] 4,224,043

[45] Sep. 23, 1980

[54] COMPACT MULTISTAGE PARTICLE SEPARATOR

[75] Inventor: George T. Dupre, Palatine, Ill.

[73] Assignee: NFE International, Ltd., Palatine, Ill.

[21] Appl. No.: 898,202

[22] Filed: Apr. 20, 1978

[51] Int. Cl.³ .............................................. B01D 50/00
[52] U.S. Cl. ...................... 55/319; 55/315; 55/341R; 55/342; 55/429; 55/432; 55/439; 55/441; 55/459C
[58] Field of Search ................. 55/318, 319, 342, 429, 55/432, 439, 441, 467, 315, 341 R, 459 C

[56] References Cited

U.S. PATENT DOCUMENTS

| | | | |
|---|---|---|---|
| 2,604,956 | 7/1952 | Israel | 55/319 |
| 3,780,502 | 12/1973 | Dupre et al. | 55/432 X |
| 4,032,424 | 6/1977 | Peters et al. | 55/441 X |
| 4,062,664 | 12/1977 | Dupre et al. | 55/343 X |

*Primary Examiner*—Kathleen J. Prunner
*Attorney, Agent, or Firm*—Merriam, Marshall & Bicknell

[57] ABSTRACT

A compact, portable multi-stage vacuum particle separator with a first stage centrifugal separator, second stage linear separator concentrically mounted in the first stage, and a third stage air filter. All three separator stages deliver their separated particulate material into a common dump hopper. The second and third stages have flexible flap valves at their bottoms to automatically transfer accumulated, separated particles into the dump hopper when the unit is shut down.

5 Claims, 3 Drawing Figures

COMPACT MULTISTAGE PARTICLE SEPARATOR

This invention relates to vacuum type apparatus for separating particles from an airstream, and in particular to portable multi-stage units in which all separator stages direct the separated particles into a single dump hopper.

BACKGROUND OF THE INVENTION

In U.S. Pat. No. 3,780,502, G. T. Dupre and T. M. DeMarco, assigned to the same assignee herein, there is described a compact, multi-stage vaccum particle separator mounted on a single unit with all three separator stages directing the separated particles into a single removable dump hopper. Reference may also be made to U.S. Pat. No. 4,062,664, G. T. Dupre, T. M. DeMarco et al., assigned to the same assignee herein, wherein there is described an improved compact, multi-stage vacuum type particle separator. Each of these vacuum separator units are useful for separating, collecting and conveying wet or dry particulate material such as sand, metal and wood chips, gravel, slag, cement, plastic pellets, mill scale, etc. as occur in foundries and other manufacturing or service facilities.

These units incorporate a centrifugal separator for removing the heaviest material; a linear separator stage for accelerating the lighter particulate material downwardly through an orifice into an elongated chamber for separation and collection of the lighter particulate material and enabling the airstream to exit the chamber through the orifice; and an air filter stage including a filter element receiving the exiting airstream from the chamber for removing the lightest of the particulate material.

While these aforementioned vacuum type particle separator units perform entirely satisfactorily, it has been desired to provide an even more compact, portable vacuum particle collector or separator apparatus which can still efficiently perform in a manner equivalent to that of the prior units.

SUMMARY OF THE INVENTION

In accordance with the principles of the present invention, a multi-stage particle separator is provided including a first stage centrifugal separator; a second stage linear separator; and a third stage air filter, all three stages of which deliver their separated particulate material into a single hopper, and the occupied volume is more than one-third less than the occupied volume of the previously described separators with a substantial reduction in total unit weight. The improved apparatus of the present invention includes a support frame, a first stage centrifugal separator defined by a vertical discharge stack mounted on the frame, a second stage linear separator concentrically mounted within the first stage separator vertical discharge stack, yet operating completely independent thereof, and a third stage air filter mounted immediately adjacent the concentric centrifugal and linear separator stages.

A removable dump hopper is mounted on a fork-lift truck for insertion into the support frame immediately below the three separator stages and is vertically movable into a sealing position therewith. During operation of the separator, the first stage centrifugal unit delivers the separated particles directly into the hopper. When the unit is shutdown, the pressure is equalized both within and without the linear separator stage and the air filter stage so that the respectively accumulated particles can be discharged through flexible flaps at the bottom of each stage and thereby fall into the same hopper. The hopper may then be lowered, removed from the support frame and pivotally emptied of the collected particulate material in a well-known manner.

The entire three stage separator apparatus utilizing a concentric first stage centrifuge-vertical stack and second stage linear separator in accordance with the principles of the present invention is 74 inches high from ground level to top (39 inches high from the top of the support frame to the top of the unit), 41 inches wide and 37 inches in length. This extremely compact, lighter weight, portable multi-stage particle separator unit is especially adaptable for use in space restricted areas where an extremely powerful vacuum source for removing or conveying particulate mterial is desired. Specifically, in this compact three-stage separator, the first stage separator vertical stack surrounds a lower centrifugal portion having an air inlet for communicating an airstream directly into the lower portion and a curved plate for enabling centrifugal movement of the airstream within the vertical stack surrounding the lower portion; the second stage linear separator is concentrically mounted within the vertical stack and above the lower centrifugal portion; and a nozzle at the top of the linear separator is aligned along the concentric axis to receive the airstream from the top of the vertical stack and so direct it into the linear separator.

DETAILED DESCRIPTION

Figure 1:
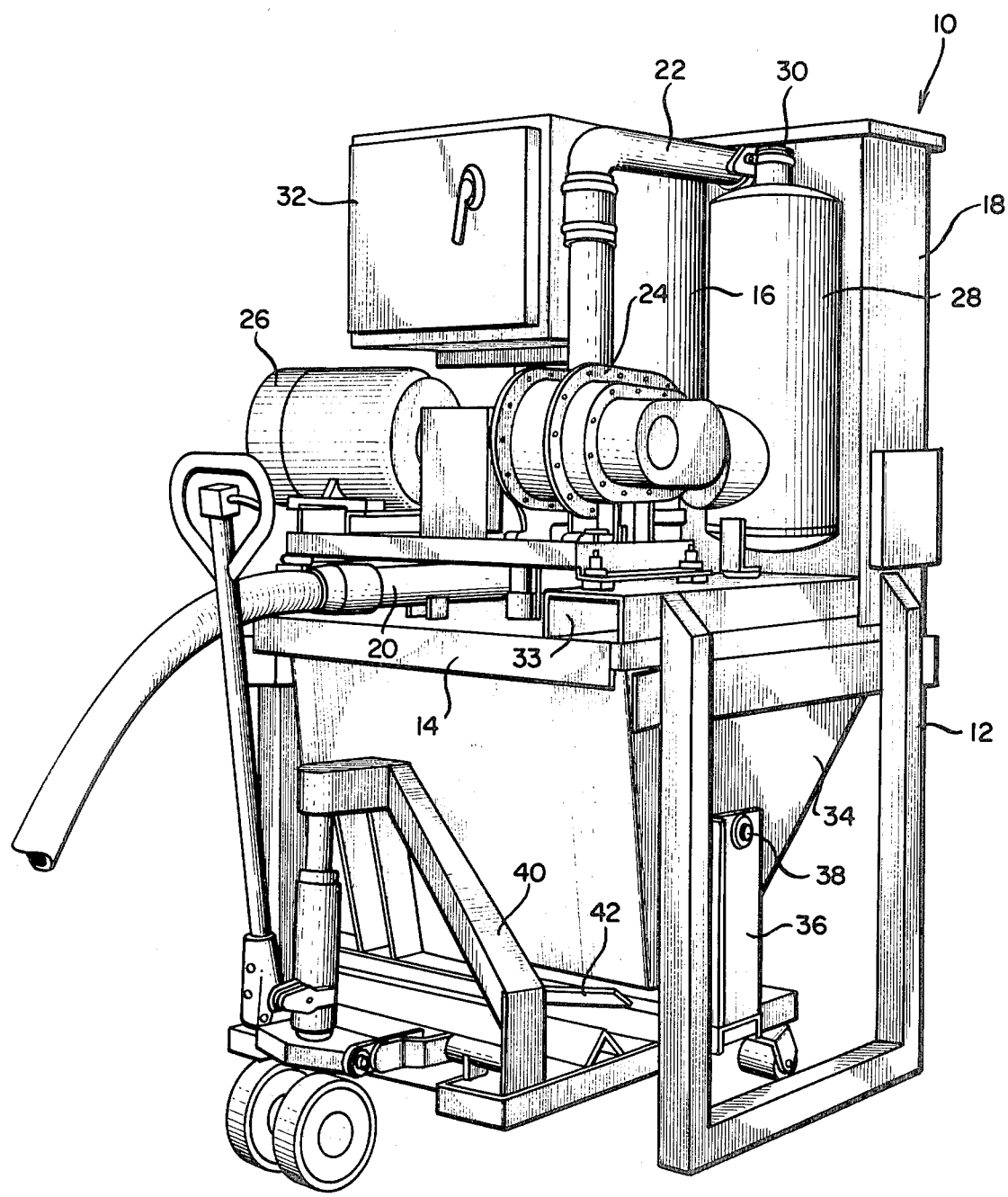
FIG. 1 is a perspective view illustrating the improved compact, portable, multi-stage vacuum particle separator constructed in accordance with the principles of the present invention.

Referring now to FIG. 1, the new improved vacuum particle separator and loader apparatus 10 includes a frame 12 including support plateform 14. The particle separating stages mounted to support platform 14 include a concentric first and second stage unit 16 and a third stage air filter chamber 18. The concentric first and second stage separator 16 includes a first stage centrifugal separator and a second stage linear separator concentrically mounted therein.

The input to the first stage centrifugal separator is coupled to a conduit 20 and the output of the second stage linear separator is coupled through conduit 21 (See FIG. 2) to the input to the thrid stage air filter chamber 18. A conduit 22 interconnects the output of air filter chamber 18 with a blower 24, the blower being driven by motor 26. The output of blower 24 is coupled to a sound muffling device 28 for venting to the atmosphere through outlet 30. A control panel 32 contains the necessary controls and safety devices for operating the unit.

As can be seen from FIG. 1, all of the aforementioned components are mounted above the support platform 14. A pair of channel members 33 are provided for insertion of the forks of a standard fork-lift truck so that the entire unit 10 can be transported from position to position.

A dump hopper 34 is mounted by means of two opposite support columns 36 and respective pivot pins 38 to the bed of a fork-lift truck 40. The fork-lift 40 and hopper 34 can be inserted underneath platform 14 and within the frame 12 as shown in FIG. 1. Raising of the hopper 34 places the top of the hopper in sealing engagement with the separator stages 16 and 18, and also raises frame 12 off of the ground level so that the entire unit 10 can be moved by means of the fork-lift truck 40. When it is desired to eliminate the separated particulate material from the hopper 34, the hopper is lowered and removed from the frame 12. by suitably moving the latch arm 42, a hopper latching mechanism (not shown) is disengaged so that the hopper 34 can rotate forwardly on the pivot pins 38 thereby dumping the accumulated collected particulate material.

Figure 2:
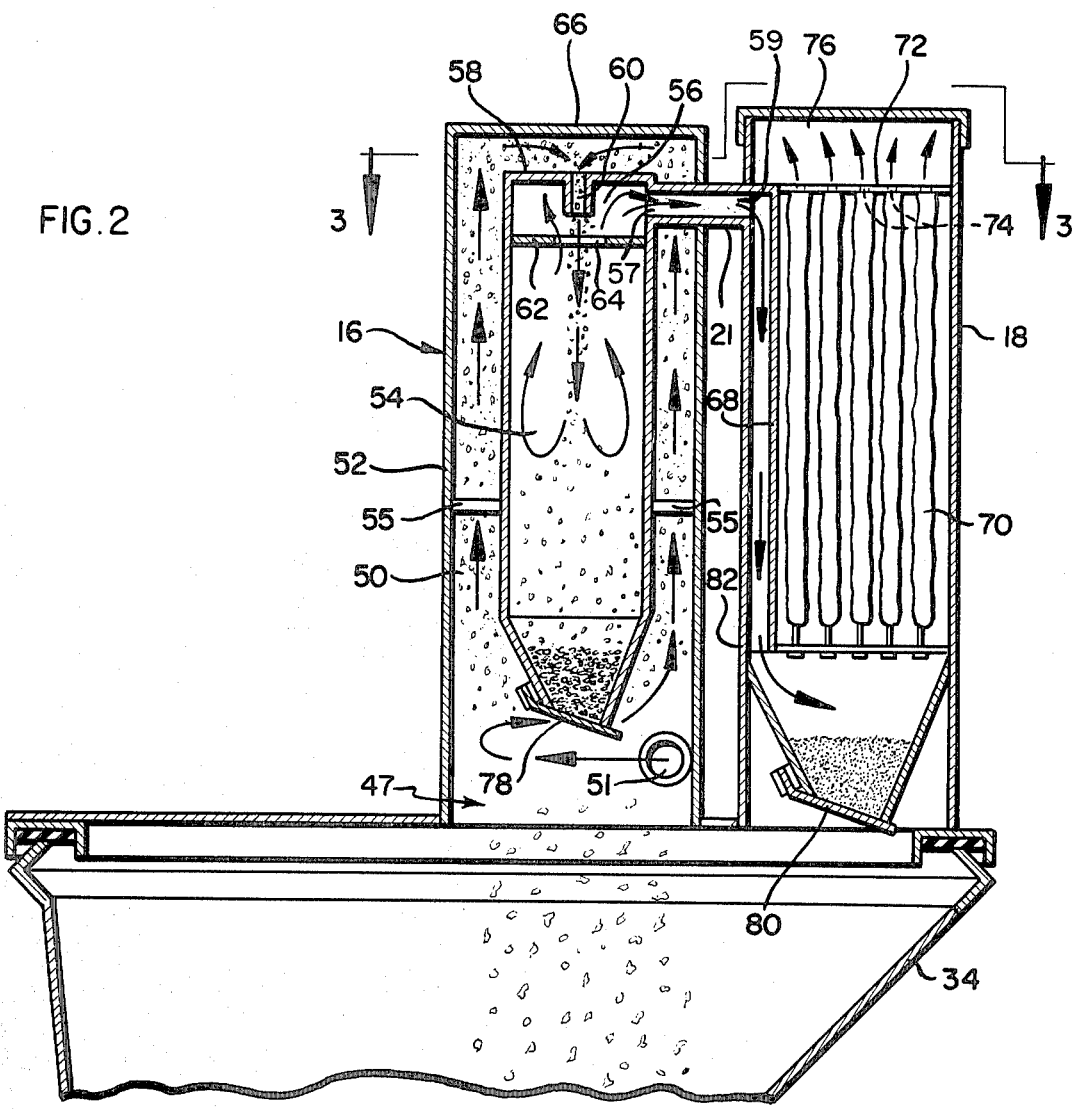
FIG. 2 is an elevational, partly sectional view illustrating the concentrically mounted first stage centrifugal separator and second stage linear separator as well as the third stage air filter chamber all depositing the respectively separated particulate material into a common removable hopper.
Figure 3:
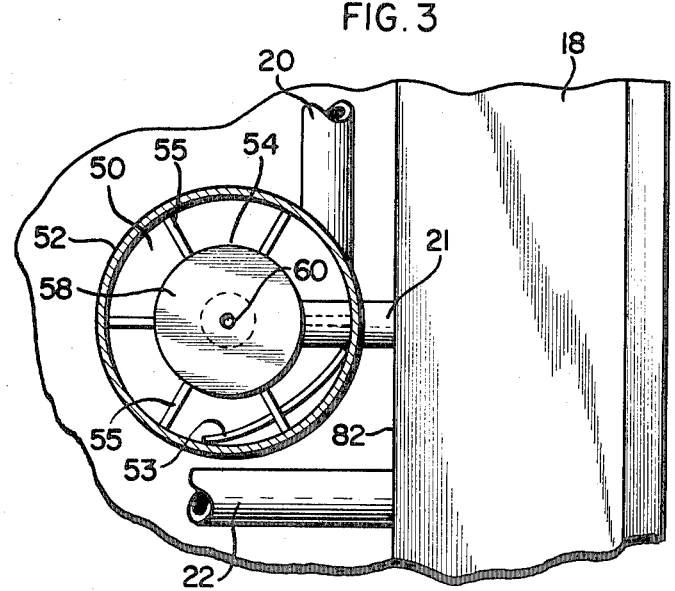
FIG. 3 is a fragmentary plan view, partly in section, taken along section lines 3—3 of FIG. 2 illustrating the concentrical alignment of the centrifugal separator and the linear separator in accordance with the principles of the present invention.

Reference may now be made to FIGS. 2 and 3 wherein the details of the concentric separator stages 16 and the air filter chamber 18 are shown. The first stage centrifugal separator 50 is defined by a vertical stack 52 which includes a lower centrifugal portion 47 with an input 51, which is coupled to the horizontal input conduit 20, and a vertical stack portion disposed above the lower centrifugal portion. The particulate material and airstream coupled to input 51 is conveyed in a curving path in the lower centrifugal unit by a curved plate 53 so that the heaviest of the particulate material is separated from the incoming airstream and falls downwardly into hopper 34. As can be seen from FIG. 2, the lower portion of centrifugal separator 50 is in open communication with hopper 34. The remaining airstream containing lighter particulate material continues upwardly in the vertical stack portion.

As can be seen from FIGS. 2 and 3, the elongated cylindrical member or vertical stack 52 forming the centrifugal separator 50 surrounds a second elongated, cylindrical member defining a second stage linear particle separator 54 mounted therein. Suitable mounting means such as spacer ribs 55 rigidly maintain the linear separator 54 located within the vertical stack 52 with the bottom of separator 54 slightly above the centrifugal first stage input 51 as shown in FIG. 2. The linear separator stage 54 includes at the top end thereof an anteroom or antechamber 56 defined between a top cylindrical plate 58 which seals the top of the anteroom 56 and which has an elongated cylindrical accelerator nozzle 60 depending therefrom, and a bottom plate 62 having a circular orifice 64. With reference to FIG. 2, it can be seen that nozzle 60 on anteroom top plate 58 is located slightly below a cover plate 66 at the top of vertical stack 52.

Cover plate 66 seals the top of the centrifugal separator stage 50 so as to guide the airstream from the vertical stack 52 through accelerator nozzle 60 and orifice 64 into the second stage linear separator 54. Thus, the air and particulate material entering through orifice 64 is directed downwardly in the chamber 54, with the length of chamber 54 sized with respect to the velocity of the incoming airstream so that the airstream rapidly extends in the chamber and its velocity is dissipated to zero before reaching the bottom quarter of the chamber 54. This enables a substantial amount of the lighter particulate material, including any wet matter to be gradually separated from the airstream as it proceeds downwardly in the chamber 54, and after separation to fall by its own weight to the bottom of the chamber 54 undisturbed by the incoming airstream. The dissipated airstream reverses direction in the chamber 54 and exits out through the orifice 64, into anteroom 56, then through anteroom outlet 57 and into the conduit or duct 21 connected to the input 59 formed in one wall 82 of the air filter chamber 18. Reference may be made for instance to the aforementioned U.S. Pat. No. 3,780,502 which contains sufficient information for one skilled in the art to dimension the chamber 54, nozzle 60 and orifice 64 for a particular desired volume of airstream with particulate material to be handled per unit of time so as to provide the desired unique separation efficiency in linear separator 54.

The airstream entering conduit or duct 21 therefore contains only the lightest of the particulate materials. This relatively particle free airstream is directed downwardly in air filter chamber 18 by means of a guide wall 68. At the bottom of guide wall 68 the airstream reverses direction and is directed upwardly to pass through a final filter medium such as the air filter bags 70 suspended within chamber 18 by means of a suspension plate 72. In a well-known manner, the airstream passes from the outside of the bags 70 to their interior and through openings 74 provided in plate 72 communicating with the interior of a respective bag. Outlet channel 76 communicates the exiting airstream to conduit 22 for return to blower 24 and eventual exiting at exhaust 30.

As can be seen from FIG. 2, both the linear separator stage 54 and the air filter chamber 18 include a respective flexible flap valve member 78 and 80 formed of rubber or other flexible type material for sealing the respective particulate material discharge openings provided at the bottom of each of these separators stages. During normal operation of the vacuum separator unit 10, blower unit 24 creates a sufficient negative pressure in separator chamber 54 and in the air filter chamber 18 so that this negative pressure draws flexible flap valves 78 and 80 into sealing position with the respective bottom of these chambers. Upon shutdown of the blower 24, the pressure within chambers 54 and 18 is equalized to the atmosphere and the respective flap valves 78 and 80 are insufficient to maintain the chamber seals. Therefore, the collected particulate material at the bottom of chambers 54 and 18 falls into the hopper 34. When the unit is restarted the flap valves reseal due to air flow and the pressure differential thus developed. All three separator stages empty directly into the single removable hopper 34. Therefore only one hopper need be emptied for the unit.

Furthermore, as can be seen from FIG. 1, the entire multi-stage separator 10 is extremely compact and portable, and yet meets the difficult requirements of a powerful, heavy duty industrial-type vacuum loading and separating unit. In particular, in a constructed embodiment of the invention, the unit measured 74 inches high including frame 12 (39 inches high for the separator stages without frame 12), 41 inches wide and 37 inches long. Centrifugal separator 50 measured about $36\frac{5}{8}$ inches high and 15 inches in diameter. Linear separator 54 measured about 27 inches in height (from the bottom of the chamber to orifice 54), and 10 inches in diameter.

Nozzle 60 measured two inches in diameter by two and one-half inches long. Orifice 64 measured three to three and one-half inches in diameter. The above dimensions of the respective components are those provided in a ten or fifteen horsepower unit. It is to be understood, of course, that for units with more or less horsepower the above dimensions, particularly the nozzle and orifice dimensions will change slightly so as to maintain the velocity of air entering chamber 54 to be a constant value. This can readily be accomplished by those skilled in the art since less air is moved by lower horsepower units as compared to greater horsepower units and the particular component dimensions may be accordingly varied.

Rather than the single outlet 21 additional outlets may be provided between separator chamber 54 and air filter chamber 18 to reduce any undesired turbulence occurring in antechamber 56 between the input airstream passing from nozzle 60 to orifice 64 and the exiting airstream from orifice 64. For instance, one or more conduits located at right angles or opposite to conduit 21 and connected at one end to antechamber 56 and at the other end to conduit 21 prior to the air filter chamber input could reduce any turbulence if this is found to be a problem. In addition, conduit 21 can be shortened if desired by locating the vertical stack 52 in tangential contact with wall 82 of air filter chamber 18.

The foregoing detailed description has been given for clearness of understanding only, and no unnecessary limitations should be understood therefrom as modifications will be obvious to those skilled in the art.

What is claimed is:

1. In a portable vacuum collector apparatus for separating particulate material from an airstream, including a movable frame, an elongated centrifugal particle separator, an air filter chamber with a bottom and an input for said airstream and having a plurality of filter elements mounted in said air filter chamber, means for mounting said centrifugal particle separator and said air filter chamber to said frame, said centrifugal particle separator including a lower centrifugal portion with an air inlet and a means for conveying said airstream in a curving path to impart centrifugal movement to said particulate material and an upstanding, closed top, cylindrical stack portion having a bottom, said cylindrical stack portion extending substantially vertically upwardly from said lower portion to convey said airstream upwardly thereby separating the heaviest of said particulate material, and blower means mounted on said frame for directing said airstream from said air inlet to said air filter chamber input, the improvement comprising:
    a vertical stack, said centrifugal particle separator being defined by said vertical stack, and said vertical stack including said lower centrifugal portion with said air inlet and said cylindrical stack portion disposed above said lower centrifugal portion;
    a linear particle separator, including:
    (a) an elongated, substantially vertical, enclosed cylindrical chamber having an orifice at the top thereof for receiving said airstream and a bottom;
    (b) an antechamber enclosure extending upwardly from said cylindrical chamber;
    (c) nozzle means at the top of said antechamber for receiving said airstream from said centrifugal particle separator and directing said airstream downwardly through said orifice into said cylindrical chamber;
    (d) the length of said cylindrical chamber being sized with respect to the velocity of said airstream entering said chamber through said orifice so as to enable a substantial amount of the particulate material to be separated from the airstream and fall and accumulate for collection at the bottom of said cylindrical chamber while the airstream reverses its direction and exits said cylindrical chamber through said orifice;
    (e) mounting means for vertically mounting said linear particle separator substantially concentrically within said upstanding cylindrical stack portion of said centrifugal particle separator to align said nozzle means along the concentric axis and guide said airstream being conveyed upwardly in said upstanding cylindrical stack portion to said nozzle means;
    (f) said mounting means maintaining said cylindrical chamber bottom located slightly above said lower centrifugal portion air inlet and maintaining said nozzle means located slightly below said closed top of said cylindrical stack portion; and
    (g) an outlet in said antechamber enclosure; and
    duct means, including a duct for interconnecting said outlet to the input of said air filter chamber.

2. The improvement of claim 1, wherein said nozzle means includes a plate sealing the top of said antechamber, and a cylindrical nozzle extending downwardly from said plate towards said orifice.

3. The improvement of claim 2, wherein said orifice is circular in shape.

4. The improvement of claim 1, including respective flexible sealing means at the bottom of said linear particle separator chamber and said air filter chamber for sealing said bottoms during operation of said blower, and unsealing said bottoms during non-operation of said blower, to enable separated particulate material accumulated in said respective chambers to be emptied therefrom.

5. A compact, portable multistage vacuum particle separator for separating particulate material from an airstream comprising:
    a frame having a platform;
    a hopper removably mounted to said frame below said platform;
    a centrifugal particle separator first stage vertically mounted to the top of said platform including an upstanding cylindrical lower portion in open communication with said hopper, said cylindrical lower portion being provided with an air inlet and a means for conveying said airstream in a curving path into the interior thereof to centrifugally separate the heaviest of said particulate material from said airstream and enable the same to fall into said hopper, and an upstanding, closed top, cylindrical stack portion extending substantially vertically upwardly from said lower portion for communicating said airstream from said air inlet upwardly from said lower portion;
    a second stage linear particle separator, including:
    (a) an elongated, substantially vertical, enclosed cylindrical chamber having an orifice at the top thereof and a bottom;
    (b) an enclosed antechamber portion extending upwardly from said cylindrical chamber having a cylindrical nozzle aligned above said orifice;
    (c) said nozzle receiving said airstream from said centrifugal particle separator and directing said airstream downwardly through said orifice into said cylindrical chamber;

(d) the length of said cylindrical chamber being sized with respect to the velocity of said airstream entering said chamber through said orifice so as to enable a substantial amount of the particulate material to be separated from the airstream and fall and accumulate at the bottom of said cylindrical chamber while the airstream reverses its direction and exits said cylindrical chamber through said orifice;

(e) means for mounting said second stage linear particle separator substantially concentrically within said cylindrical stack portion of said first stage centrifugal particle separator to align said nozzle along the concentric axis and guide said airstream from said cylindrical stack portion to said nozzle;

(f) said mounting means maintaining said cylindrical chamber bottom located slightly above said lower centrifugal portion air inlet and maintaining said nozzle located slightly below said closed top of said cylindrical stack portion and;

(g) an outlet in said antechamber portion;

a third stage air filter chamber mounted to the top of said platform above said hopper having an input coupled to said outlet in said antechamber portion, and having a bottom;

blower means, including a blower mounted to the top of said platform, and conduit means for directing said airstream through said first, second and third stages; and flexible flap closure means respectively mounted to the bottoms of said second and third stages, including flexible flap members responsive to the operation of said blower for sealing said stages during operation of said blower and for flexing open and unsealing said bottoms during non-operation of said blower to enable the accumulated separated particulate material in said second and third stages to fall into said hopper.

* * * * *